(12) United States Patent
Chan (10) Patent No.: US 6,452,883 B2
(45) Date of Patent: Sep. 17, 2002

(54) METHOD AND APPARATUS APPLIED IN AN OPTICAL STORAGE DEVICE FOR ESTIMATING RADIAL SPEED OF DISC

(75) Inventor: Yi-Chung Chan, Taipei (TW)

(73) Assignee: Via Technologies, Inc., Taipei (TW)

( * ) Notice: Subject to any disclaimer, the term of this patent is extended or adjusted under 35 U.S.C. 154(b) by 14 days.

(21) Appl. No.: 09/789,622

(22) Filed: Feb. 22, 2001

(30) Foreign Application Priority Data

Feb. 24, 2000 (TW) ........................................ 89103293 A (51) Int. Cl.⁷ ................................................ G11B 7/00
(52) U.S. Cl. .................. 369/53.14; 369/53.1; 369/44.32
(58) Field of Search ............................... 369/47.1, 53.1, 369/53.11, 53.12, 53.13, 53.14, 53.15, 47.48, 44.28, 44.34, 44.32

(56) References Cited

U.S. PATENT DOCUMENTS 5,793,715 A * 8/1998 Alon et al. .......... 369/44.28 X
6,147,944 A * 11/2000 Kwon et al. ............. 369/44.32

* cited by examiner

*Primary Examiner*—Muhammad Edun
(74) *Attorney, Agent, or Firm*—Rabin & Berdo, P.C.

(57) ABSTRACT

An apparatus or method for estimating a radial speed of a disc is suitable for an optical storage device. The apparatus is used in an optical storage device for receiving a pulse signal and an eccentricity, and generating an estimated radial speed of the disc. The apparatus comprises a frequency detector and a sinusoidal wave generator. The frequency detector is used for receiving the pulse signal and then outputs a rotation frequency. The sinusoidal wave generator is used for receiving the rotation frequency and the eccentricity, and then outputs an estimated radial speed value of the disc. As mentioned, the estimated radial speed has an amplitude related to the eccentricity and the rotation frequency, and a frequency related to the rotation frequency, and when a jump direction is changed, the estimated radial speed is zero-crossing

15 Claims, 8 Drawing Sheets

METHOD AND APPARATUS APPLIED IN AN OPTICAL STORAGE DEVICE FOR ESTIMATING RADIAL SPEED OF DISC

This application incorporates by reference Taiwanese application Ser. No. 089103293, Filed Feb. 24, 2000.

BACKGROUND OF THE INVENTION

1. Field of Invention

The present invention relates to a method and apparatus for estimating a radial speed of an optical disk. More particularly, the present invention relates to a method and apparatus applied in an optical storage device for estimating a radial speed without being affected by eccentric phenomenon.

2. Description of Related Art

As demand for high capacity storage medium increases, optical discs become more important. Research into methods of rapidly and reliably reading data stored in the optical disc has become a major effort for all manufacturers.

Figure 1:
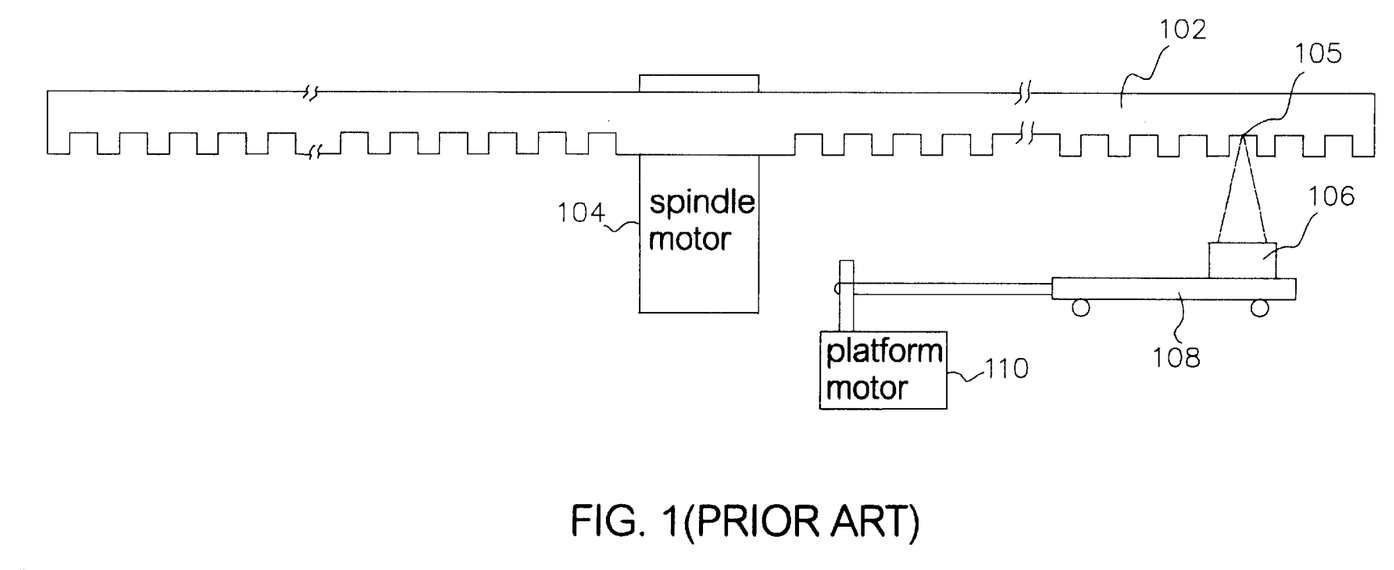

FIG. 1 is a structure diagram for illustrating conventional servo controllers of an optical storage device. A disc 102 is put upon a spindle motor 104 and rotated by the spindle motor 104. Digital data stored in a plurality of tracks on the disc 102 is read by an optical pick-up 106. The optical pick-up 106 is assembled on a sled 108 and moved to a suitable position by moving the sled 108 via a sled motor 110 for reading data stored in the disc 102.

Figure 2:
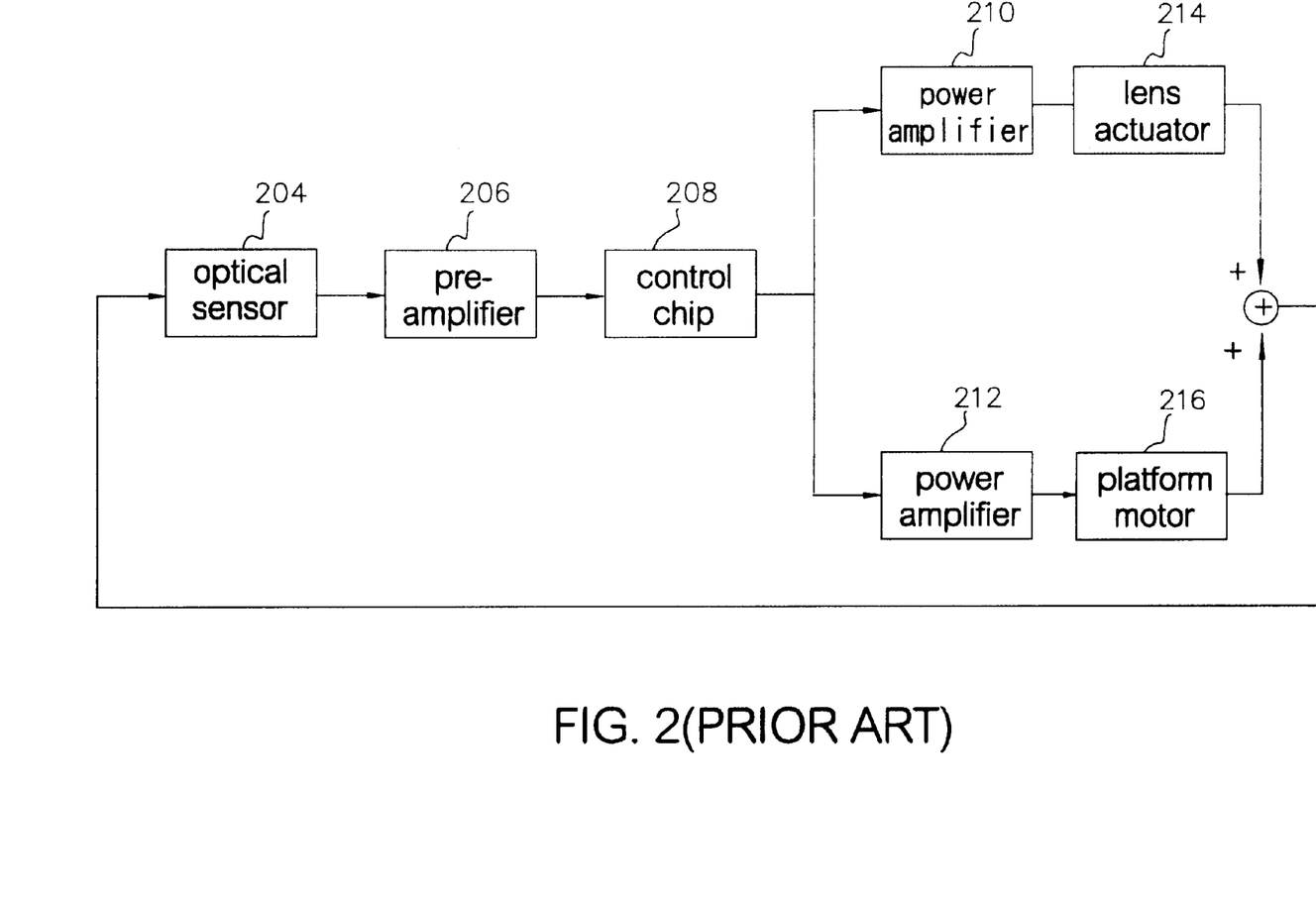
FIG. 2 (Prior Art) is a function block diagram of the servo controller of the optical storage device shown in FIG. 1.

FIG. 2 is a function block diagram of the servo controller of the optical storage device shown in FIG. 1. Referring to FIGS. 1 and 2, the spindle motor 104 begins to rotate when the optical storage device is activated. Laser diode within the optical pick-up 106 emits a laser and a focusing mechanism is activated by the servo controller of the optical storage device. The focusing mechanism focuses the laser beam reflected off the optical disc 102 onto an optical sensor 204 of the optical pick-up 106. Then, the servo controller activates a tracking mechanism such that the optical pick-up 106 locks the tracks to be read. The optical sensor 204 of the optical pick-up 106 is used for receiving optical signals of the laser beams reflected by the disc 102 and then transforms these optical signals into electric signals that are further processed by a pre-amplifier 206. The pre-amplifier 206 then outputs analog signals to a control chip 208. The analog signals can be radio frequency (RF) signals related to the data, focusing error (FE) signals, tracking error (TE) signals, radio frequency ripple (RFRP) signals etc., of which the focusing error signals are used to control the focusing operation of the optical pick-up 106.

The control chip 208 outputs control signals to power amplifiers 210 and 212. Output signals of the power amplifier 210 are then transmitted to a lens actuator 214 for controlling fine adjustments of the focusing, tracking and seeking operations of the lens, while output signals of the power amplifier 212 are transmitted to a sled motor 216 for controlling rough adjustments of the tracking and seeking operations of the optical pick-up. The resulting data of the lens actuator 214 and the sled motor 216 are fed back to the optical sensor 204 and, in this way, the optical pick-up 106 can successfully read data stored in the disc.

The lens mounted on the optical pick-up 106 moves up and down vertically until the reflected laser beam focuses on the optical sensor 204. The tracking operation means that the lens mounted on the optical pick-up 106 is fine adjusted in short horizontal distances such that spots, generated by the laser beams and then focused through the lens, can lock the demanded tracks on the disc 102. As for the seeking operation, the lens mounted on the optical pick-up 106 and the sled 108 move horizontally to find the target tracks on the disc 102. In addition, a complete sinusoidal signal is generated in track crossing signal, such as the TE signal or the RFRP signal, while the optical pick-up jumps one track.

Figure 3:
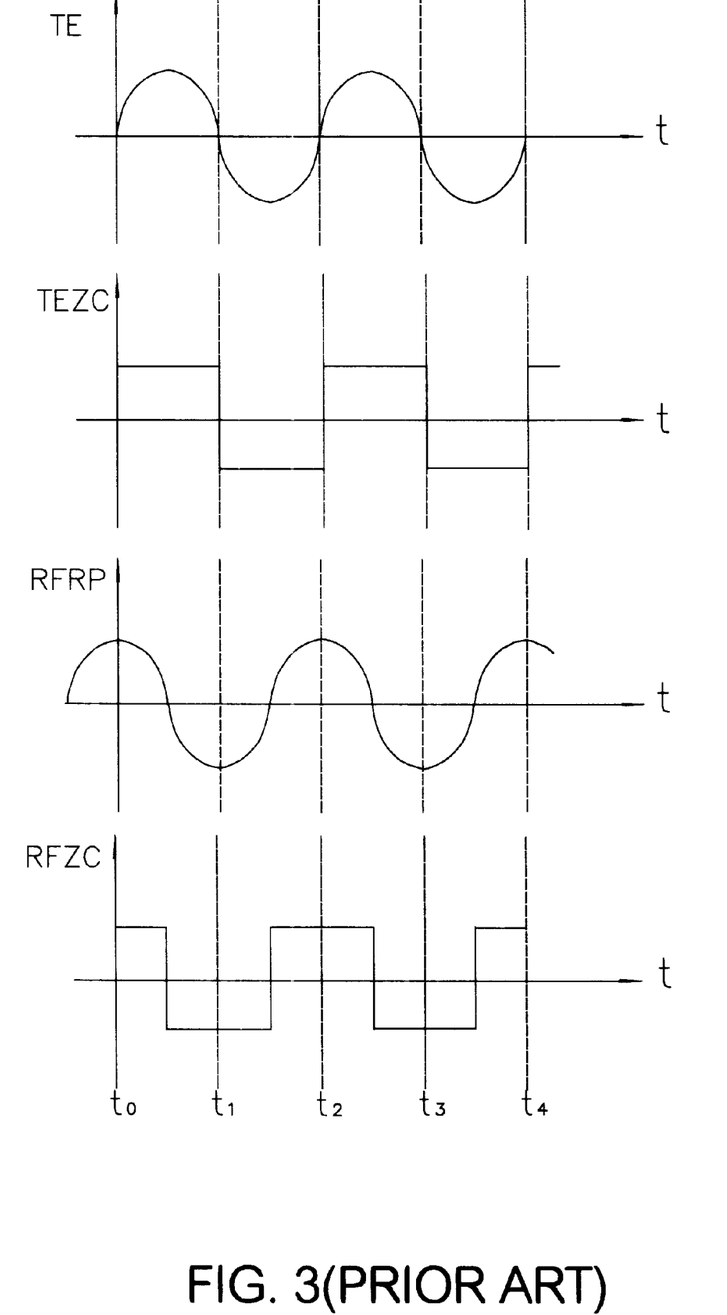
FIG. 3 (Prior Art) is a waveform diagram, showing a tracking error signal TE, tracking error zero cross signal TEZC, radio frequency ripple signal RFRP, and radio frequency ripple zero cross signal RFZC respectively.

Referring to FIG. 3, which shows a timing diagram of a tracking error signal TE, a tracking error zero cross signal TEZC, a radio frequency ripple signal RFRP, and a radio frequency ripple zero cross signal RFZC respectively. The TE signal is used to indicate tracking errors; namely, when the spots focused on the disc have an offset relative to target track, the TE signal also varies according to the offset. At time t0, t2, is and t4, the spots are correctly focused on the target tracks of the disc 102, and therefore the voltage of the tracking error signal TE is Vref and the slopes of the tracking error signal TE corresponding to time t0, t2 and t4 are positive. At time t1 and t3, spots are focused between two adjacent tracks. At these times, the potential of the tracking error signal TE is also Vref, but the slopes of the tracking error signal TE corresponding to time t1 and t3 are negative. When the track is locked, the tracking error signal TE maintains as Vref. The tracking error zero cross signal TEZC can be obtained by comparing the tracking error signal TE with the reference potential Vref. When the tracking error signal TE is larger than Vref, TEZC signal is high; otherwise it is low.

In addition, the radio frequency ripple signal RFRP is defined as the difference between the upper envelope and the lower envelope of the radio frequency signal RF. When the spot is focused on the track of the disc 102, the RFRP signal reaches a peak value; when the spot is focused between tracks of the disc 102, the RFRP signal reaches a bottom value. The phase of the RFRP signal leads the phase of the TE signal by 90 degree when the optical pick-up 106 shifts outwards with respect to the disc 102, and the phase of the RFRP signal lags behind the phase of the TE signal by 90 degree when the optical pick-up 106 shifts inwards with respect to the disc 102. Therefore, by detecting the phase difference between the RFRP signal and the TE signal, the direction of the optical pick-up 106 shifting with respect to the disc 102 is obtained. Furthermore, when the amplitude of the RFRP signal is larger than the average value of the RFRP signal, the RFZC signal is high, otherwise low.

The number of track jumped by the optical pick-up 106 is obtained by calculating the number of the rising edges of the TEZC signal or the RFZC signal. The period T between two adjacent rising edges is defined as taken in jumping one track. The inverse of T is defined as a relative radial speed $V_{ld}$ of the optical pick-up 106 with respect to the disc 102. For example, as shown in FIG. 3, in the period to $t_0$ $t_4$, the optical pick-up 106 crosses two tracks and the radial speed $V_{ld}$ is $2/(t_4-t_0)$ Hz.

Figure 4:
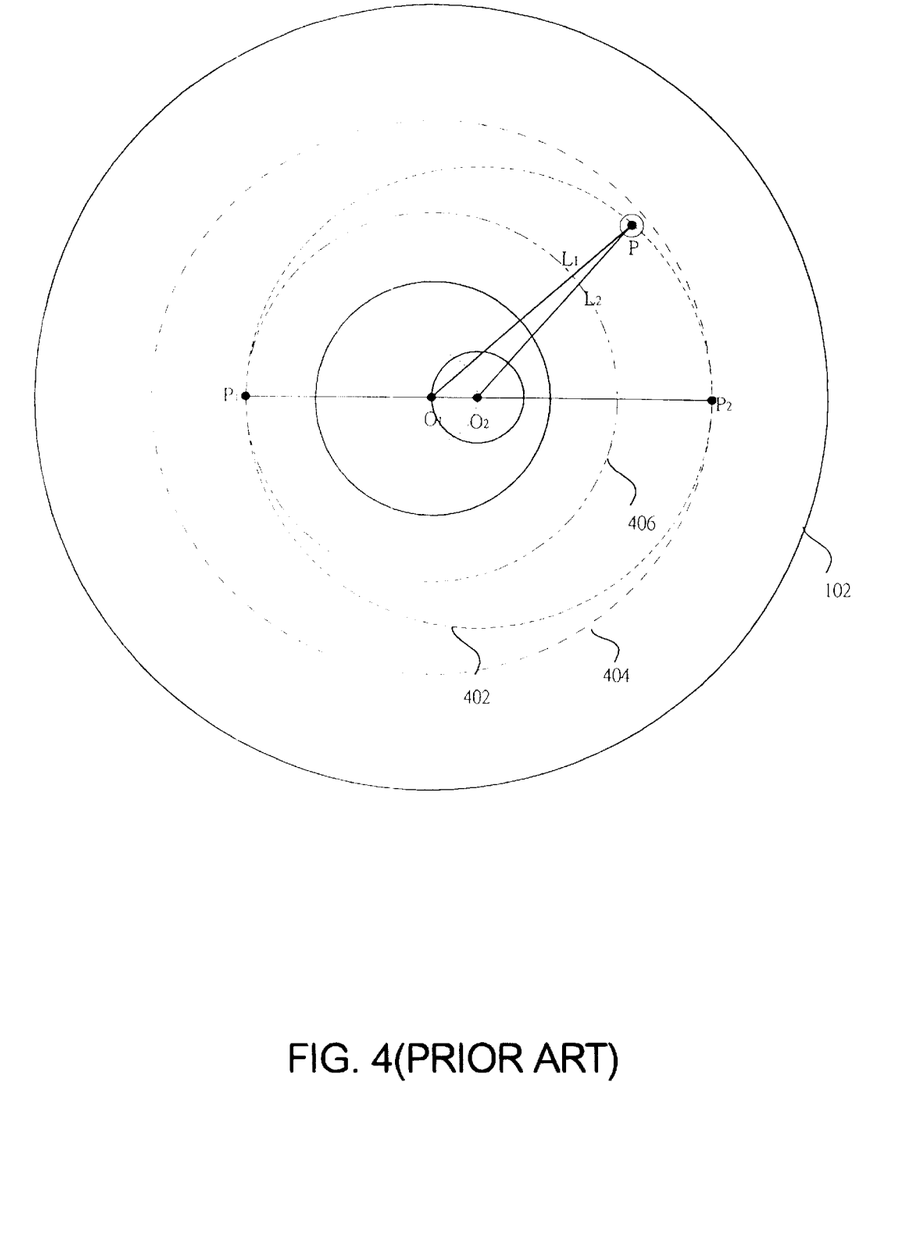
FIG. 4 (Prior Art) shows an eccentric phenomenon for the disc.

FIG. 4 shows an eccentric phenomenon for the disc, which generally exists in all discs. The eccentric phenomenon results from manufacturing errors during the manufacturing of the discs, or clamping errors while the disc is put on the spindle motor 104. The tracks on the disc have a common center, which is called an ideal disc center $O_1$; while the disc is put on the spindle motor, the disc is rotated against the eccentric disc center $O_2$, or called the center of the spindle motor 104. As shown in FIG. 4, the distance between the centers $O_1$ and $O_2$ is defined as an eccentricity of the disc 102.

Referring both to FIGS. 4 and 1, when the optical storage device system activates the focusing operation but does not activate the tracking servo control, the horizontal position of the optical pick-up 106 is fixed at location P. If no eccentricity exists, the center $O_2$ of the spindle motor 104 is the same as the ideal disc center $O_1$. Consequently, when the spindle motor 106 rotates at frequency FRQ, no radial speed exists and the optical pick-up is locked along the track. In contrast, if the eccentricity exists, the center $O_2$ of the spindle motor 104 is not coincided with the ideal disc center $O_1$. Consequently, a radial speed component periodically exists between the disc 102 and the optical pick-up 106 when the spindle motor 106 rotates at a frequency FRQ. Then, the TE and RFRP signals are asserted as sinusoidal waveform.

In addition, when the optical pick-up is fixed at the location P, when the tracking and seeking servo controls are not activated, the circle 402 is the trajectory of the optical pick-up 106 crossing the disc 102 when the spindle motor 104 rotates one circle. The circle 404 is the outermost trajectory of the optical pick-up 106 crossing the disc 102 while the circle 406 is the innermost trajectory of the optical pick-up 106 crossing the disc 102. The circle 402 is centered at $O_2$ with a radius $L_2$. The Line $O_1O_2$ intersects the circle 402 at points $P_1$ and $P_2$ respectively. The circle 406 is centered at $O_1$ with a radius $O_1P_1$, while the circle 404 is centered at $O_1$ with a radius $O_1P_2$.

Figure 5:
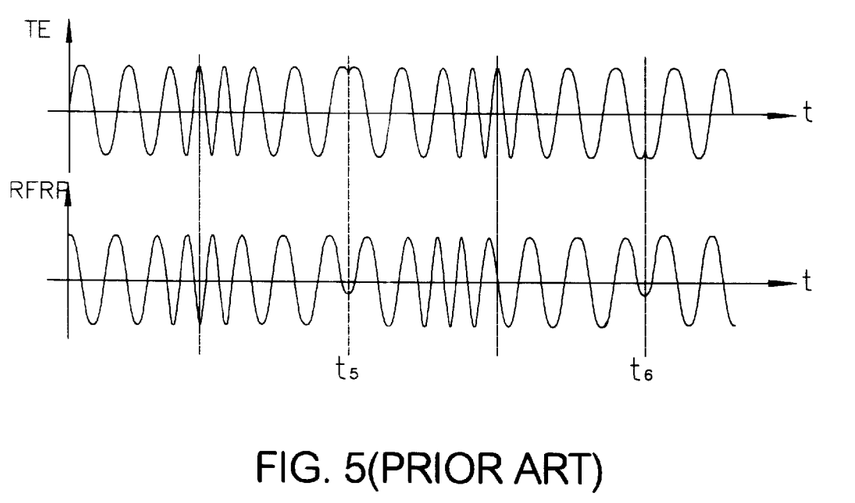
FIG. 5 (Prior Art) shows waveforms of the TE and RFRP signals when the disc contains the eccentricity and the optical pick-up is fixed at the location P.

FIG. 5 shows waveforms of the TE and RFRP signals when the disc contains the eccentricity and the optical pick-up is fixed at the location P. From the TE and RFRP signals detected by the optical pick-up 106, during the time interval that the disc is rotated half circle (before time $t_5$), the optical pick-up 106 is clockwise trajected on the disc 102 from $P_1$ to $P_2$ such that the optical pick-up 106 moves outwards relative to the disc 102, the disc 102 moves inwards. Accordingly, the radial speed $V_{ld}$ varies from slow to fast, and then from fast to low until the optical pick-up 106 moves inwards relative to the disc 102 at time $t_5$. Namely, in another half circle in time period $t_5$ to $t_6$, the optical pick-up 106 clockwise moves from $P_2$ to $P_1$ such that the optical pick-up 106 moves inwards relative to the disc 102 due to that the disc 102 moving outwards. Accordingly, the radial speed $V_{ld}$ varies from low to fast, and then from fast to low until the optical pick-up 106 moves outwards relative to the disc 102 at time $t_6$.

Figure 6A:
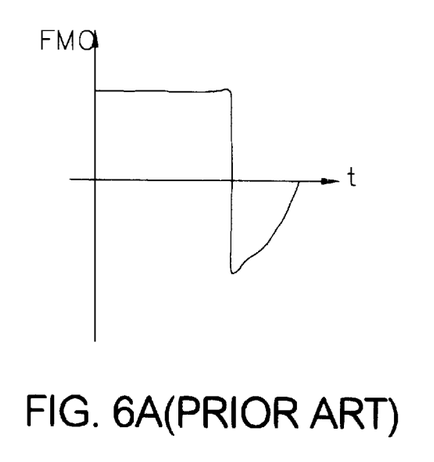
Figure 6B:
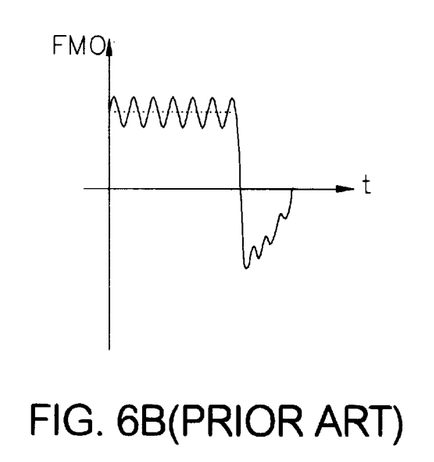
FIG. 6B shows a waveform of the control force with eccentricity.

FIGS. 6A and 6B shows waveforms of the control force signals for pushing the sled during long seeking process. The eccentricity of the disc causes the optical storage device system to be unstable, as shown in waveform of the control force signals FMO. During the speed feedback control of the long seeking, the radial speed $V_{ld}$ of the optical pick-up 106 with respect to the disc 102 is compared with a predetermined speed profile of the optical pick-up 106 for obtaining a speed error signal which is the difference of the radial speed $V_{ld}$ and the predetermined speed profile. The speed error signal is then inputted to the control chip 208 to generate the control force signal FMO to the power amplifier 212 for controlling the seeking operation of the sled motor 216 such that the optical pick-up 106 moves according to the predetermined speed profile.

FIG. 6A shows a waveform of the control force without eccentricity, while FIG. 6B shows a waveform of the control force with eccentricity. Comparing FIGS. 6A and 6B, if there is no eccentricity, the waveform of the control force signal FMO of the sled 108 becomes smoother. The radial speed $V_{ld}$ of the optical pick-up 106 with respect to the disc 102, calculated from the track crossing signal, will contain a radial speed $V_d$ of the disc 102 with respect to the ground while the eccentricity exists, resulting in that as shown in FIG. 6B the control force signal FMO is considerably unstable. The sled is unstable accordingly, and the system also becomes unstable. Furthermore, the tracking stability when the seeking operation is finished becomes worse. In a high speed system, the system efficiency is lowered due to the eccentricity.

The traditional method cannot quantize and compensate the eccentricity, and therefore, system trouble shooting due to the eccentricity cannot be solved.

SUMMARY OF THE INVENTION

As embodied and broadly described herein, the invention provides an apparatus and method for estimating a radial speed of the disc, and further, a radial speed of an optical pick-uprelative to ground is obtained for controlling the seeking and tracking operations. Therefore, the seeking servo control is not affected by the eccentric phenomenon. The stability of the seeking operation or tracking operation increases, and so does the access rate.

It is one objective of the present invention to provide an apparatus for estimating a radial speed of a storage media. The apparatus is used in an optical storage device for receiving a pulse signal and an eccentricity, and generating an estimated radial speed of the storage media. The apparatus comprises a frequency detector and a sinusoidal wave generator. The frequency detector is used for receiving the pulse signal and then outputs a rotation frequency. The sinusoidal wave generator is used for receiving the rotation frequency and the eccentricity, and then outputs an estimated radial speed value of the storage media. As mentioned, the estimated radial speed has an amplitude related to the eccentricity and the rotation frequency, and a frequency related to the rotation frequency, and when a jump direction is changed, the estimated radial speed is zero-crossing.

It is another objective of the present invention to provide a method of estimating a radial speed of a disc. The method is designed for an optical storage device, wherein a pulse signal is outputted from a driving chip of a spindle motor of the optical storage device. First, an eccentricity of the storage media is obtained. Next, a rotation frequency of the spindle motor from the pulse signal is calculated when a track crossing direction of the disc is changed. Then, an estimated radial speed of the storage media, which is a sinusoidal signal, is generated from the eccentricity and the rotation frequency. The estimated radial speed has an amplitude related to the eccentricity and the rotation frequency, and a frequency related to rotation frequency, and when a jump direction is changed, the estimated radial speed is zero-crossing.

It is still another objective of the present invention to provide a control chip, which is used for an optical storage device capable of controlling an optical pick-up for reading data stored in a storage media, wherein the control chip receive a track crossing signal and a pulse signal. The control chip comprises a direction detector, an eccentricity detector, a radial speed estimator and a seeking algorithm unit. The direction detector is used for receiving the track crossing signal and then outputs a track crossing direction signal. The eccentricity detector is used for receiving the track-crossing signal and then generates an eccentricity of the disc. The radial speed estimator is used for receiving the eccentricity, the pulse signal and the track crossing direction signal, and then outputs an estimated radial speed of the disc. The seeking algorithm unit is used for receiving the track crossing signal to generate a relative radial speed of the optical pick-up with respect to the disc, for receiving the estimated radial speed of the disc to output an estimated speed of the optical pick-up with respect to the ground. As mentioned, the estimated radial speed has an amplitude related to the eccentricity and the rotation frequency, and a frequency related to is equal to the rotation frequency, and when a jump direction is changed, the estimated radial speed is zero-crossing.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings, FIG. 1 (Prior Art) is a structure diagram for illustrating a conventional servo controller of an optical storage device;

FIG. 6A (Prior Art) shows a waveform of the control force without disc eccentricity, while

DESCRIPTION OF THE PREFERRED EMBODIMENTS

Figure 7:
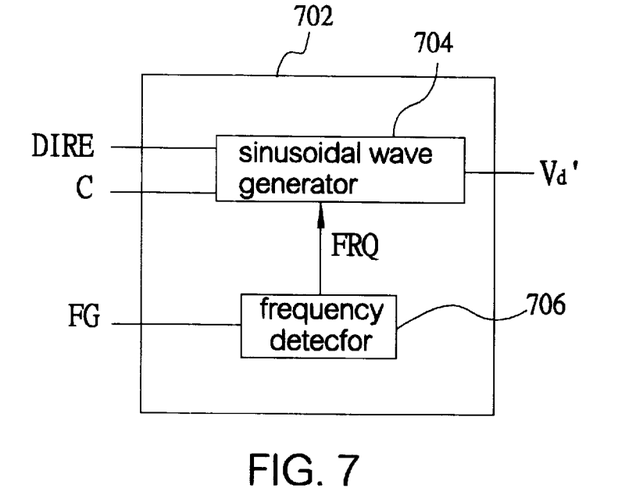
FIG. 7 is a block diagram of an apparatus for estimating a radial speed of a disc according to one preferred embodiment of the present invention.

FIG. 7 is a block diagram of an apparatus for estimating a radial speed of a disc according to one preferred embodiment of the present invention. As shown in FIG. 7, the apparatus 702 for estimating a radial speed of a disc comprises a sinusoidal wave generator 704 and a frequency detector 706. The sinusoidal wave generator 702 is used for receiving a track crossing direction signal DIRU and an eccentricity C, and the frequency detector 706 is used for receiving a pulse signal FG and then outputting a rotation frequency FRQ of a spindle motor to the sinusoidal wave generator 704 for modify the phase of signals generated by sinusoidal wave generator 704. The sinusoidal wave generator 704 then outputs an estimated value $V_d'$ of the radial speed of the disc. The frequency detector 706 can be achieved by using a phase lock loop (PLL), for example.

Figure 8:
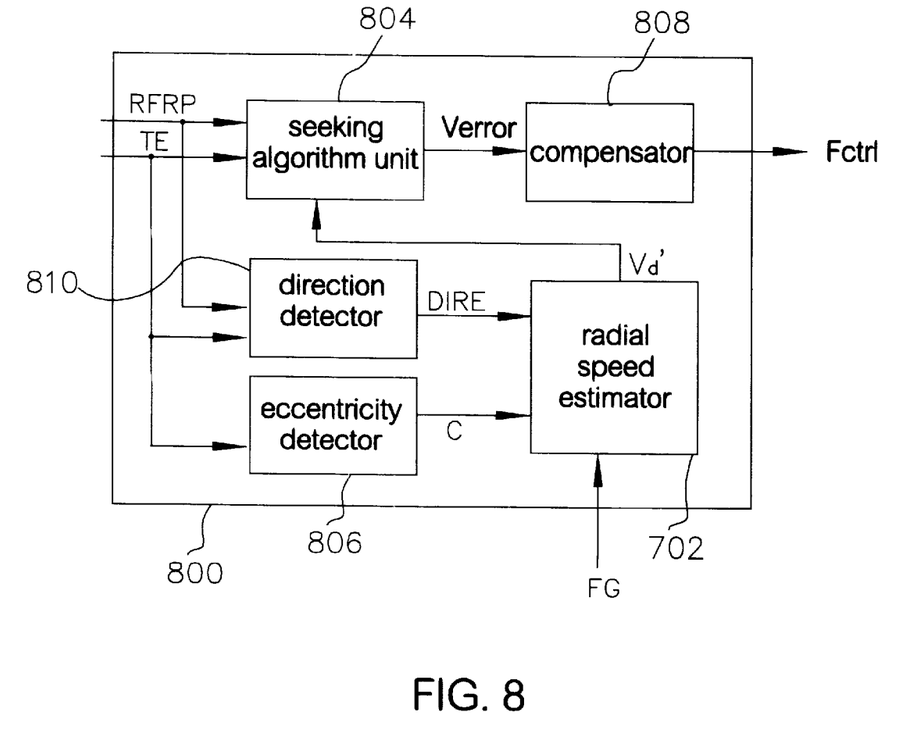
FIG. 8 is a block diagram, showing a servo controller of an optical storage device according to the embodiment of the present invention.

FIG. 8 is a block diagram, showing a control chip of a servo controller of an optical storage device according to the embodiment of the present invention. The control chip 800 comprises a seeking algorithm unit 804, an eccentricity detector 806, a compensator 808, a direction detector 810, and a radial speed estimator 702. The seeking algorithm unit 804 utilizes the track crossing signal sensed by an optical pick-up (not shown) to obtain a relative radial speed $V_{ld}$ of the optical pick-up with respect to the disc 102, and outputs control signals $V_{error}$ for controlling seeking operation of the sled (not shown) and the optical pick-up. The compensator 808 is used for receiving the control signals $V_{error}$ from the seeking algorithm unit 804 and therefore compensates the radial speed of the optical pick-up and the platform, which means that the compensator 808 outputs control signals $F_{ctrl}$ for accelerating or decelerating the sled and the optical pick-up.

The eccentricity detector 806 is used for detecting the eccentricity C of the disc, and then transmitting the detected eccentricity C to the radial speed estimator 702. The direction detector 810 receives the TE and RFRP signals to determine the track crossing direction of the optical pick-up relative to the disc 106, and then outputs the track crossing direction signal DIRE. The radial speed estimator 702 receives the track crossing direction signal DIRE, the pulse signal FG from a motor driver, and the eccentricity C to estimate a radial speed $V_d'$ of the disc 102 with respect to ground, caused by the eccentric phenomenon. The estimated radial speed $V_d'$ is then fed back to the seeking algorithm unit 804 to estimate another relative speed $V_1$ of the optical pick-up relative to ground, and the seeking algorithm unit 804 can compensate the speed of the optical pick-up and control seeking speed.

The relationship between the radial pick-up head-to-disk speed $V_{ld}$, the pick-up head-to-ground speed $V_1$ and the radial disc-to-ground speed $V_d$ is as follows:

$$V_{ld} = V_l - V_d \quad (*)$$

The relative radial speed $V_{ld}$ of the optical pick-up 106 is usually used as the ground speed $V_1$ of the optical pick-up according to the conventional method. However, if the eccentric phenomenon of the disc 102 is significant, the radial speed $V_d$ of the disc due to the eccentric phenomenon becomes larger, causing the difference between the speed $V_{ld}$ and $V_1$ to be not negligible. In this case, if the relative radial speed $V_{ld}$ 106 is used as the ground speed $V_l$, unstability of the optical pick-up is more serious.

According to the preferred embodiment of the present invention, the radial speed estimator 702 can obtain the radial speed $V_d'$ of the disc relative to ground, and the speed $V_d'$ is then fed back to the seeking algorithm unit 804 for calculating an estimated speed $V_l'$ of the optical pick-up relative to ground according to another formula $V_l' = V_{ld} + V_d'$. Then, the estimated ground speed $V_l'$ is used for controlling the long seeking operation of the optical pick-up 106. In this way, both the stability of seeking and tracking when seeking over are increased, and data accessing time is reduced.

Figure 9:
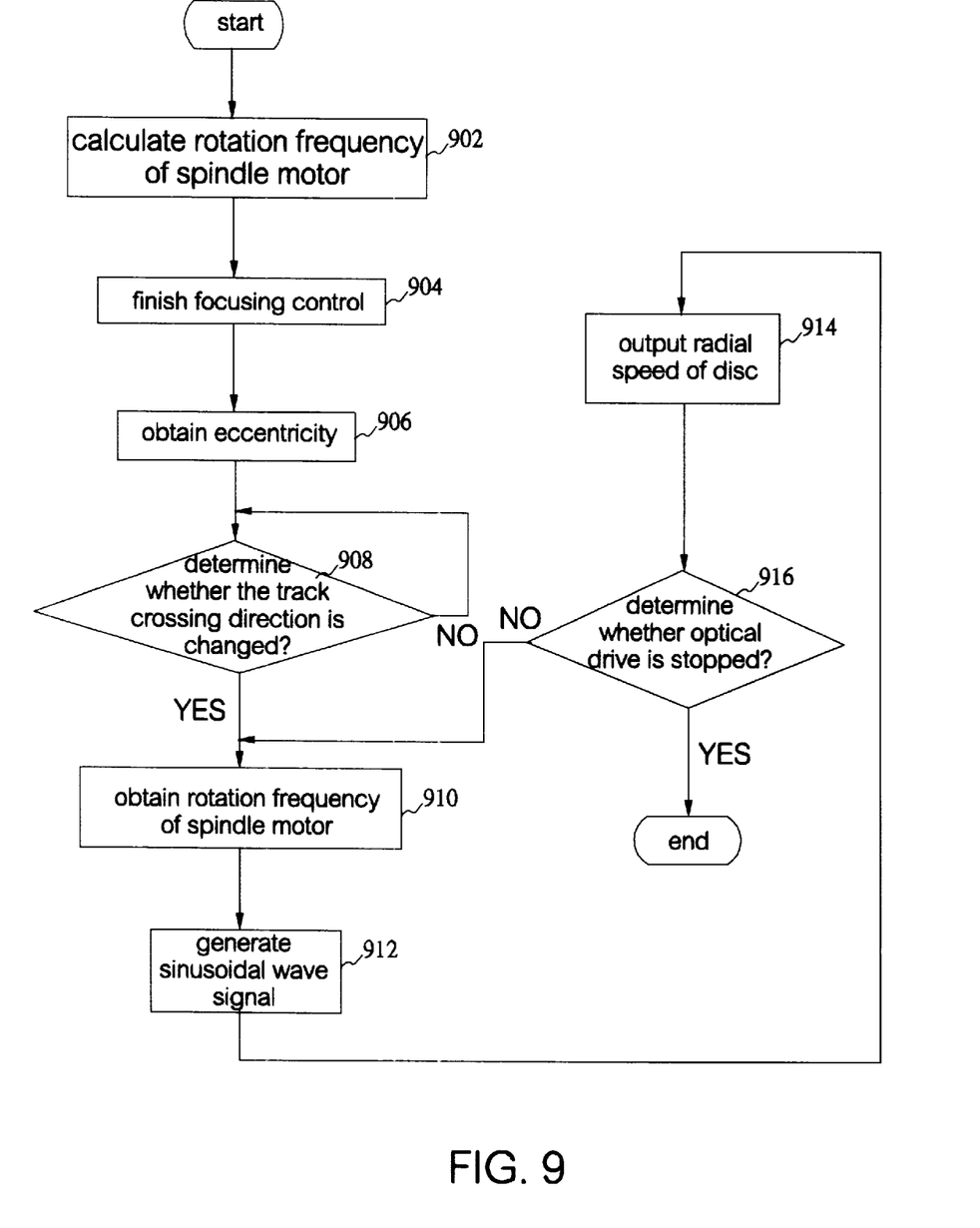
FIG. 9 is a flow chart for schematically showing the method of estimating the radial speed of the disc.
Figure 10:
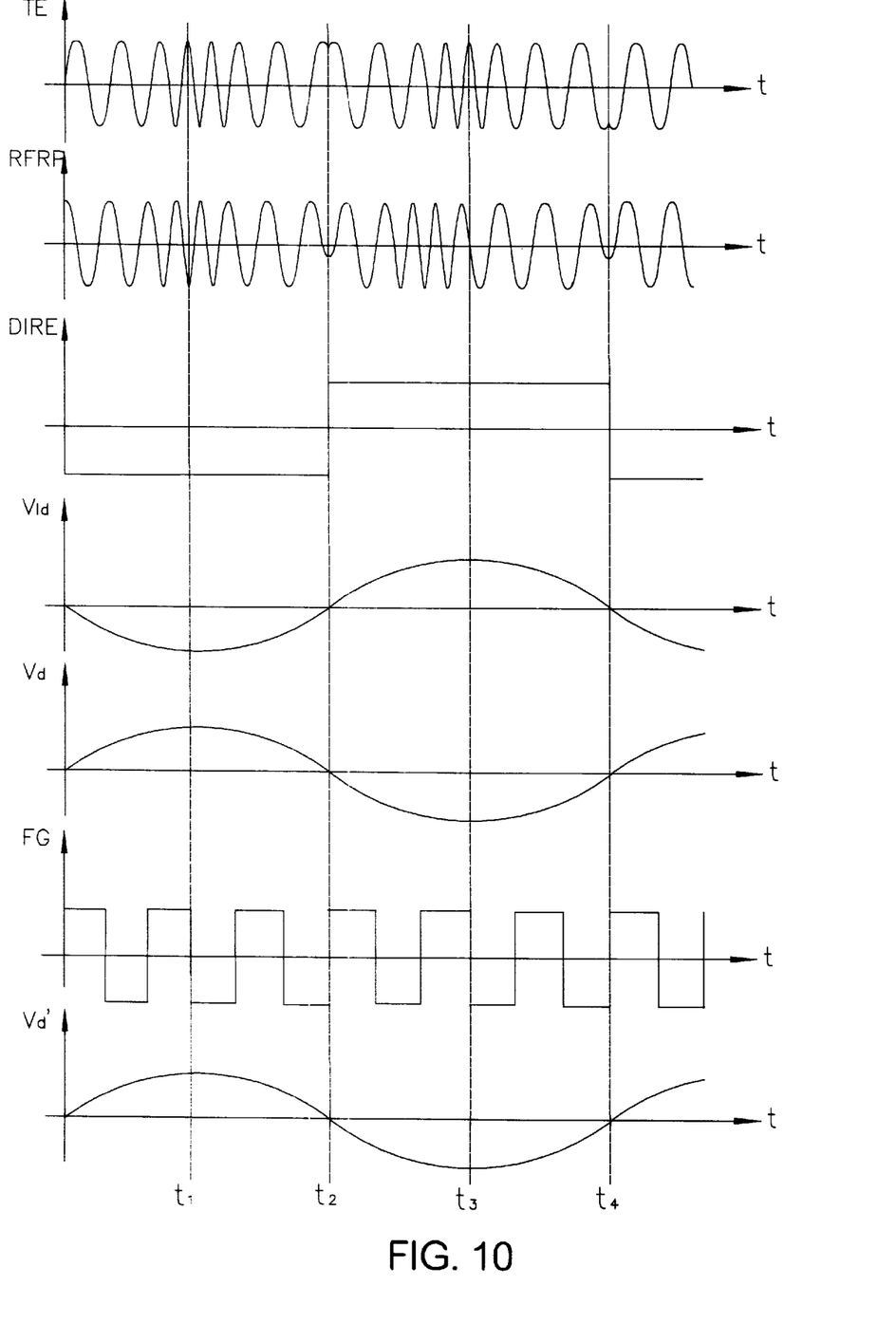
FIG. 10 shows waveforms of the related signals shown in FIG. 9.

FIG. 9 is a flow chart for schematically showing the method of estimating the radial speed of the disc, and FIG. 10 shows waveforms of the related signals shown in FIG. 9. Referring to FIGS. 9 and 10, at step 902, the rotational frequency FRQ of the spindle motor is first calculated by the frequency detector 706 based on the received pulse signal FG . The pulse signal FG can assert a fixed pulse number during one rotation of the spindle motor 104. Accordingly, the frequency detector 706 can then count the pulse number of the pulse signal FG to obtain the rotation frequency FRQ.

Next, step 904 is executed to perform the focusing operation. Namely, the lens of the optical pick-up moves vertically until the laser beam reflected by the disc is focused onto the optical sensor. When the focusing operation is complete but the tracking operation is not activated, the horizontal position of the optical pick-up keeps unchanged. In the meantime, due to the eccentric phenomenon, the waveforms of the tracking error signal TE and the radio frequency ripple signal RFRP are shown in FIG. 10.

As shown in FIG. 10, the track crossing direction signal DIRE indicates the track crossing direction of the optical pick-up with respect to the disc, wherein a high level indicates an outward jump while a low level indicates an inward jump. Since the horizontal position of the optical pick-up keeps unchanged, the speed $V_1$ in the formula $V_{ld}=V_1-V_d$ is zero, and therefore, $V_{ld}$ and $V_d$ are equal in magnitude but in opposite sign. Namely, variation of $V_d$ is obtained from monitoring the $V_{ld}$. From time $t_0$ to $t_2$, the disc moves inwards, which means that the optical pick-up moves outwards respective to the disc 102.

For example, the radial speed $V_{ld}$ of the optical pick-up with respect to the disc 102 varies from slow to fast, and reaches a maximum value $V_{max}$ at time $t_1$. During $t_1$ to $t_2$, the radial speed $V_{ld}$ of the optical pick-up with respect to the disc varies from fast to slow, and then the jump direction of the pick-up head changes into cross the track inward until time $t_2$. Afterwards, the radial speed $V_{ld}$ of the optical pick-up with respect to the disc varies form slow to fast, reaches its maximum value at time $t_3$, and then the jump direction of the pick-up head changes into cross the track outwards until time $t_4$.

The radial speed $V_{ld}$ of the optical pick-up with respect to the disc, obtained from the TE signal is a sinusoidal wave. From experiment, the maximum value $V_{max}$ of the radial speed $V_{ld}$ of the optical pick-up with respect to the disc is proportional to the eccentricity C and the rotation frequency FRQ of the spindle motor, and the frequency of $V_{ld}$ is equal to FRQ. As discussed above, the horizontal position of the optical pick-up 106 is fixed, and therefore the speed $V_{ld}$ and $V_d$ are equal in magnitude and opposite in sign. Therefore, according to the present invention, the maximum value $V_{max}$ of the radial speed $V_{ld}$ of the optical pick-up with respect to the disc is proportional to the eccentricity C and the rotation frequency FRQ of the spindle motor, and the frequency of $V_{ld}$ is equal to FRQ.

Referring to FIG. 4, the following description is a proof that the waveform is a sinusoidal wave. The center $O_2$ of the spindle motor 104 is set to be the origin of the coordinate. The coordinates P of the optical pick-up 106 is assumed ($P_x$, $P_y$), $L_2$ is the distance between the center $O_2$ of the spindle motor 104 and the coordinates P of the optical pick-up while $L_1$ is the distance between the ideal center $O_I$ of the disc and the coordinates P of the optical pick-up. The distance $L_2$ between the center $O_2$ of the spindle motor 104 and the coordinates P of the optical pick-up 106 is a constant under the condition that the horizontal position of the optical pick-up is fixed, and $L_2=\sqrt{Px^2+Py^2}$. As mentioned above, when the location P of the optical pick-up is fixed, $V_{ld}(t)=-V_d(t)$. The disc is rotated clockwise and therefore the coordinates of the ideal center $O_I$ of the disc 102 is assumed as ($c\cdot\cos(-\omega t)$, $c\cdot\sin(-\omega t)$)=($c\cdot\cos(\omega t)$, $-c\cdot\sin(\omega t)$), wherein $\omega=2\cdot\pi\cdot f$ and f is the rotation frequency FRQ of the spindle motor 104 and c is the eccentricity C. Then, the following formula is obtained:

$$L_1(t) = \sqrt{(Px - c\cdot\cos(\omega t))^2 + (Py + c\cdot\sin(\omega t))^2} \quad (1)$$

$$= \sqrt{(Px^2 + Py^2) - 2\cdot c\cdot(Px\cdot\cos(\omega t) - Py\cdot\sin(\omega t)) + c^2\cdot(\cos^2(\omega t) + \sin^2(\omega t))}$$

$$= \sqrt{L_2^2 - 2\cdot c\cdot(Px\cdot\cos(\omega t) - Py\cdot\sin(\omega t)) + c^2}$$

Let vector $$\overrightarrow{O_2P}$$

coincides with the x-axis of the coordinate with origin $O_2$; namely, the coordinates P(Px, Py) of the optical pick-up is ($L_2$, O) and the formula (1) can be simplified as follow.

$$L_1(t) = \sqrt{L_2^2 - 2\cdot c\cdot L_2\cdot\cos(\omega t) + c^2} \quad (2)$$

Formula (2) represents the distance variation, of the location P of the optical pick-up with respect to the ideal disc center $O_I$ when the disc rotates. The radial speed $V_{ld}$ of the optical pick-up with respect to the disc is expressed as follow:

$$V_{1d}(t) = \frac{d}{dt}L_1(t)$$

$$= \frac{1}{2}\cdot(L_2^2 - 2\cdot c\cdot L_2\cdot\cos(\omega t) + c^2)^{-\frac{1}{2}}\cdot(2\cdot c\cdot L_2\cdot\omega\cdot\sin(\omega t))$$

$$= \frac{L_2}{L_1}\cdot c\cdot\omega\cdot\sin(\omega t)$$

since $c<<L_2$ and therefore $$\frac{c}{L_2}\approx 0.$$

From formula (2), $$\frac{L_2}{L_1} = \sqrt{\frac{L_2^2}{L_2^2 - 2*c*L_2*\cos(\omega t) + c^2}}$$

$$= \sqrt{\frac{1}{1 - 2*\left(\frac{c}{L_2}\right)*\cos(\omega t) + \left(\frac{c}{L_2}\right)^2}} \cong 1$$

which is a constant. Therefore, we can obtain the following result:

$$V_d(t)=-V_{1d}(t). =-c\cdot\omega\cdot\sin(\omega t) \quad (3)$$

Accordingly, the radial speed $V_d$ of the disc is sinusoidal and proportional to the eccentricity C of the disc 102 and the rotation frequency $\omega$ of the spindle motor The frequency of speed $V_d$ is equal to the frequency FRQ of the spindle motor.

Accordingly, the present invention uses the eccentricity C and the rotation frequency FRQ of the spindle motor to estimate the radial speed $V_d'$ of the disc due to the eccentric phenomenon.

At step 906, the eccentricity C is detected by the eccentricity detector 806. Referring to FIG. 4, assuming P is the location of the optical pick-up and the optical pick-up is radially fixed, the distance $L_2$ between $O_2$ and P is a constant. If the disc is rotated such that P is located on line $O_1O_2$ and $O_2$ is located at the mid point between P and $O_1$, the distance between P and $O_1$ is $L_1$, where $L_1=L_2+C$. When the disc is rotated half circle, O1 moves to the opposite side of $O_2$ such that $O_1$ is located at the mid point of P and O2 and therefore the distance between P and $O_1$ is $L_1'$, where $L_1'=L_2-C$. Hence, $L_1-L_1'=2C$. In addition, $L_1-L_1'$ is equal to the track crossing number of the optical pick-up multiplying the track pitch, which is double of the eccentricity C. Therefore, the method for detecting the eccentricity C using the eccentricity detector 806 is as follow. First, the track crossing number is calculated during that the disc 102 rotates in half circle and the track crossing number is then divided by two for obtaining the eccentricity C.

The track pitch is 1.6 μm ($10^{-6}$ meter) for a compact disc (CD), and 0.74 μm for a digital versatile disc (DVD). The rotating period of the disc can be calculated from the rotation frequency FRQ of the spindle motor at step 902.

At step 908, it is determined whether the track crossing direction is changed. The track crossing direction signal DIRE from the direction detector 810 can indicate the track crossing direction. If track crossing direction is from inward to outward, the radial speed estimator 702 is activated to execute step 910; otherwise, step 908 is performed.

Once the optical storage device activates the tracking servo control, the track is locked by the optical pick-up. Meanwhile, the tracking error signal TE and the radio frequency ripple signal RFRP are converged to a line, and $V_{ld}$ and $V_d$ cannot be deduced from the track crossing signal. Furthermore, if the optical storage device activates the seeking servo control, the track crossing signal is asserted, and therefore $V_{ld}$ is obtained. However, the optical pick-up have a relative movement with respect to ground, or $V_1$ is not zero, resulting $V_{ld}$ is not equal to $V_d$ and therefore $V_d$ becomes unknown. Accordingly, the radial speed estimator for estimating the current radial speed of the disc is necessary.

At step 910, the rotation frequency FRQ of the spindle motor is obtained. While the frequency detector 706 receives the pulse signal FG, the rotation frequency FRQ is outputted to the sinusoidal wave generator 704. The frequency detector 706, for example, comprises a counter and a timer, wherein the counter is used for counting pulse numbers of the received pulse signal FG, for example six-pulse, and the timer is used for calculating one rotation period of the disc. The rotation frequency FRQ of the spindle motor is then easily calculated. The frequency detector is further used for modifying the phase of the estimated radial speed $V_d'$ of the disc. For example, at the rising edge of the first pulse within one period of the pulse signal FG, the estimated radial speed $V_d'$ is the zero value of the positive slope of a sine wave; at the rising edge of the fourth pulse within one period of the pulse signal FG, the estimated radial speed $V_d'$ is the zero value of the negative slope of a sine wave.

At step 912, the sinusoidal wave generator 704 outputs a sinusoidal wave. For example, FIG. 10 shows a sine wave initiating at a point where the track crossing direction is changed from inward to outward. The generated sinusoidal wave represents the estimated radial speed $V_d'$ of the disc, with a frequency equal to the rotation frequency FRQ of the spindle motor and an amplitude proportional to the eccentricity C and the rotation frequency FRQ, wherein the proportional constant is equal to the maximum radial speed Vmax of the disc over the eccentricity C and the rotation frequency FRQ.

When radial speed estimator 702 is activated, the frequency detector 706 receives the pulse signal FG such that the radial speed estimator 702 can lock the rotation frequency FRQ of the spindle motor, thereby the frequency and the phase of the sinusoidal wave generated by the sinusoidal wave generator are modified. The access rate varies on demand in the optical storage device system, and therefore the rotation frequency FRQ of the spindle motor is switched accordingly. In addition, the rotation speed of the spindle motor changes while the optical storage device system is operated in constant linear speed (CLV) mode. However, the frequency detector 706 is capable of locking the frequency FRQ of the spindle motor, and therefore the radial speed estimator 702 can continuously estimates the radial speed $V_d'$ of the disc.

Then, step 914 is performed that the radial speed estimator 702 outputs the estimated radial speed $V_d'$ to the seeking algorithm unit 804 for compensating the eccentric phenomenon. Then, step 916 is performed to determine whether the optical storage device stops operation. If the optical storage device keeps on operation, then step 910 is repeated to continuously detect the rotation frequency of the spindle motor for outputting the estimated radial speed of the disc; otherwise, the procedure of the present invention is ended.

The method of the present invention begins after step 910 is performed. Then, only step of monitoring the pulse signal FG generated from the spindle motor requires to complete the procedure, while the other functional modules can continuously work. For example, the tracking or seeking servo control can continuously work normally. While the estimated radial speed $V_d'$ is feedback to the seeking algorithm unit 804, the estimated speed $V_l'$ of the disc with respect to the ground can be calculated. Namely, by adding the $V_{ld}$ and $V_d'$, the speed $V_l'$ of the disc with respect to ground is calculated.

According to the present invention, there are many implementation. For example, a radial speed estimating means receives the eccentricity C and the rotation frequency FRQ of the spindle motor for outputting the estimated radial speed $V_d'$, wherein the rotation frequency FRQ of the spindle motor is calculated from the pulse signal FG generated by a circuit external to the radial speed estimating means. Or, the radial speed estimating means can receive the rotation frequency FRQ of the spindle motor and the pulse signal FG, and the pulse signal is used for modifying the phase of the estimated radial speed $V_d'$.

According to the apparatus and method for estimating the radial speed of the disc of the present invention, the seeking servo control is not affected by the eccentric phenomenon. Therefore, the stability of the seeking operation or tracking operation increases and the speed for accessing the disc increases as well.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An apparatus for estimating a radial speed of a storage media, used in an optical storage device, for receiving a pulse signal and an eccentricity, and generating an estimated radial speed of the storage media, the apparatus comprising:

a frequency detector, for receiving the pulse signal and then outputting a rotation frequency; and a sinusoidal wave generator, for receiving the rotation frequency and the eccentricity, and outputting an estimated radial speed of the storage media;

wherein the estimated radial speed has an amplitude related to the eccentricity and the rotation frequency, and a frequency related to the rotation frequency, and when a jump direction is changed, the estimated radial speed is zero-crossing.

2. The apparatus of claim 1, wherein the amplitude of the estimated radial speed is in proportional to the eccentricity and the rotation frequency.

3. The apparatus of claim 1, wherein the sinusoidal signal is a sine wave.

4. The apparatus of claim 1, wherein the optical storage device is a compact disc-read only memory (CD-ROM) drive.

5. The apparatus of claim 1, wherein the optical storage device is a digital versatile disc (DVD) compatible system.

6. The apparatus of claim 1, wherein the sinusoidal wave generator further receives a track crossing direction signal with respect to the disc for indicating a track crossing direction of an optical pick-up.

7. A method of estimating a radial speed of a storage media, used for an optical storage device, wherein a pulse signal is outputted from a spindle motor of the optical storage device, the method comprising steps of:

a. obtaining an eccentricity of the storage media;

b. calculating a rotation frequency of the spindle motor from the pulse signal when a track crossing direction of the disc is changed; and c. generating an estimated radial speed of the storage media, which is a sinusoidal signal, from the eccentricity and the rotation frequency;

wherein the estimated radial speed has an amplitude related to the eccentricity and the rotation frequency, and a frequency related to rotation frequency, and when a jump direction is changed, the estimated radial speed is zero-crossing.

8. The method of claim 7, wherein the sinusoidal signal is a sine wave signal.

9. The method of claim 7, wherein the amplitude of the estimated radial speed is in proportional to the eccentricity and the rotation frequency.

10. The method of claim 7, further comprising a step before the step a is executed:

a1. finishing a focusing control operation.

11. A control chip, used for an optical storage device capable of controlling an optical pick-up for reading data from/writing data into a storage media, wherein the control chip receive a track crossing signal and a pulse signal, the control chip comprising:

a direction detector for receiving the track crossing signal and then outputting a track crossing direction signal;

an eccentricity detector for receiving the track crossing signal and then generating an eccentricity of the disc;

a radial speed estimator for receiving the eccentricity, the pulse signal and the track crossing direction signal, and then outputting an estimated radial speed of the disc; and a seeking algorithm unit for receiving the track crossing signal to generate a relative radial speed of the optical pick-up with respect to the disc, for receiving the estimated radial speed of the disc to output an estimated speed of the optical pick-up with respect to the ground, wherein the estimated radial speed has an amplitude related to the eccentricity and the rotation frequency, and a frequency related to is equal to the rotation frequency, and when a jump direction is changed, the estimated radial speed is zero-crossing.

12. The control chip of claim 11, wherein the track crossing signal is a tracking error signal.

13. The control chip of claim 11, wherein the track crossing signal is a radio frequency ripple signal.

14. The control chip of claim 11, wherein the track crossing signal is a tracking error zero-crossing (TEZC) signal.

15. The control chip of claim 11, wherein the track crossing signal is a radio frequency zero-crossing (RFZC) signal.

* * * * *